(12) United States Patent
Lenz (10) Patent No.: US 7,966,865 B2
(45) Date of Patent: Jun. 28, 2011

(54) METHOD FOR BALANCING RADICAL PROJECTIONS DETACHED FROM A ROTATING ASSEMBLY

(76) Inventor: Michael Alfred Wilhelm Lenz, Mukwonago, WI (US)

( * ) Notice: Subject to any disclaimer, the term of this patent is extended or adjusted under 35 U.S.C. 154(b) by 363 days.

(21) Appl. No.: 12/319,268

(22) Filed: Jan. 5, 2009

(65) Prior Publication Data

US 2010/0170339 A1 Jul. 8, 2010

(51) Int. Cl.
*G01M 1/00* (2006.01)
(52) U.S. Cl. ....................................................... 73/65.01
(58) Field of Classification Search ................ 73/65.01, 73/455, 456
See application file for complete search history.

(56) References Cited

U.S. PATENT DOCUMENTS

| | | | |
|---|---|---|---|
| 2,338,705 A | | 11/1942 | Reibek |
| 2,430,948 A | * | 11/1947 | Platt .............................. 416/144 |
| 3,938,762 A | * | 2/1976 | Murphy ...................... 244/17.13 |
| 4,078,422 A | | 3/1978 | Brunsch et al. |
| 4,971,641 A | * | 11/1990 | Nelson et al. ................... 156/64 |
| 4,991,437 A | | 2/1991 | Hanchett |
| 5,140,856 A | | 8/1992 | Larsen |
| 5,475,622 A | | 12/1995 | Reinfelder et al. |
| 5,824,897 A | | 10/1998 | Beachum et al. |
| 7,370,529 B2 | | 5/2008 | Lenz |

* cited by examiner

*Primary Examiner* — Lisa M Caputo
*Assistant Examiner* — Octavia Davis (57) ABSTRACT

The invention discloses an improved method and apparatus to statically equalize the span wise and chord wise moments of a detached plurality of radial projections. These detached radial projections are associated with a rotating assembly and constitute the majority of its rotating mass. When installed on the rotating assembly, the balanced radial projections will necessarily produce a center of rotating mass approximately concentric with its axis of rotation, thereby minimizing vibrations associated with its rotation. The method to statically equalize the span wise moments of the radial projections comprises first determining the span wise moment by finding the center of gravity and multiplying the distance from the center of gravity to the plane of attachment of the radial projection to the rotating assembly by its total weight.

20 Claims, 13 Drawing Sheets

METHOD FOR BALANCING RADICAL PROJECTIONS DETACHED FROM A ROTATING ASSEMBLY

CROSS REFERENCE TO RELATED APPLICATIONS

Not applicable.

STATEMENT REGARDING FEDERALLY SPONSORED RESEARCH AND DEVELOPMENT

Not applicable

BACKGROUND OF INVENTION

1. Field of Invention

This invention relates to the balancing of a rotating assembly having radial projections such that the vibratory effect of having the center of rotating mass eccentric to the axis of rotation is minimized.

2. Related Art

Whether used for aerodynamic lift, for the generation of power, or for cooling, the radial projections, or air foils in these cases, are part of a rotating assembly. It is necessary that the center of mass of the rotating assembles is concentric with its axis of rotation for optimal performance of these respective functions. Any deviation from this concentricity will represent additional forces which must be borne by a given structure that supports the rotating assembly. These additional forces manifest themselves as vibration and can not only interfere or diminish the ability of the rotating object to perform its function but can also accelerate the fatigue life of all the interconnected components themselves e.g. bearings, gears, shafts, structural supports connected to the rotating assembly. In wind or water turbines, increasing the degree of unbalance not only decreases the mechanical life of connected components but will also increase the necessary wind or water velocity required to for the generation of power.

Investigation into related art shows several methods to statically balance detached blades. Referenced in U.S. Pat. No. 5,824,897 to Beachum et al. (1998) and taught in U.S. Pat. No. 4,991,437 to Hanchett (1991) is a method to have a specimen blade connected to a reference blade over a fixed fulcrum where the fulcrum is positioned at the point of connection between the two blades. Corrective weight is either added or subtracted in a trial and error method until the respective blades are in equilibrium with each other. That is to say, if the blades are positioned in a horizontal fashion and released, the blades will remain stationary or balanced. The size of the fulcrum assembly would be proportional to the size of the blade being balanced. On large wind turbine blades whose length can be in excess of 60 meters and whose weight can be in excess of 16,000 kg, the fixture size would render it non-portable. Additionally, the area to balance the blades would be in excess of twice the blade length. Furthermore, a trial and error method is less efficient with respect to time as compared with having a prescriptive weight and distance correction. It would be impractical to establish a profile of weight distribution or span wise and chord wise moments for a radial projection. The method and apparatus does not lend itself to any type of automation.

U.S. Pat. No. 5,824,897 to Beachum et al. (1998) discloses a fixture where a single blade is attached to the fixture at its point of attachment and multiple load cells are used to indicate weight. The moment of the blade is then calculated based on the measurement indication of the load cells and the relative distances to the point of attachment. Corrective weight then can be added or subtracted based upon a virtual master blade specification. The fixture is limited to the application of helicopter blades which are of relatively short length as compared to a blade of a wind turbine whose length may exceed 60 meters. Multiple fixtures would be required to service blades from multiple applications. The fixture would necessarily be proportionate to the size of the blade being balanced, rendering the fixture to be non-portable and subsequently not suitable for field use in the extreme case of blades associated with wind turbines. Additionally, it would be impractical to establish a profile of weight distribution or span wise and chord wise moments for a radial projection. The method and apparatus does not lend itself to any type of automation.

It is well known in the art to balance a rotating mass with radial projections as a complete assembly. The art is generally limited to rotating masses which are sufficiently small in diameter, have sufficient speed, and can be performed without external forces such as those which are environmentally induced. U.S. Pat. No. 5,140,856 to Larson (1992) teaches one method of a balancing a complete assembly whose parameters fall outside of the well known art which requires the use of fixtures, specialized equipment and associated skill set, and requires personnel to perform the process at great heights and in proximity to rotating equipment. The method is time consuming and also extremely subject to environmental influences such as wind which will thereby affect the accuracy of the results.

U.S. Pat. No. 7,370,529 to Lenz (2008) discloses a method of balancing a rotating object with radial projections as a complete assembly but is limited to objects where the radial projections rotate around a stationary center. This method only covers a limited class of objects and certainly does not include the class of objects associated with helicopters and wind turbines.

It is desirable to have an improved method and apparatus to balance radial projections that provides a simple, practical, portable, prescriptive, and economical means which not only encompasses the class of radial projections addressed in prior art but is also not restricted to the length of the radial projection as in the extreme case of wind turbine blades. It is also desirable to have a method and apparatus which can allow minimal human intervention during the process as can be realize through process automation.

BRIEF SUMMARY OF INVENTION

One object of the invention is to provide a method and apparatus which can not only be used to balance radial projections detached from a rotating assembly but to balance those radial projections whose lengths and weights are extreme as in the case of the wind turbine application and to balance them relative to the radial projections attached to a given rotating assembly.

It is another object of the invention to provide an apparatus which is simple and portable for the all lengths of radial projections.

It is yet another object of the invention to provide a method and apparatus to establish a profile of weight distributions and associated span wise and chord wise moments of a radial projection for comparison to a reference profile, to balance a radial projection, and to be suitable for process automation.

| Reference Numerals In Drawings | |
|---|---|
| 20 | Radial Projection e.g. wind turbine blade |
| 21 | Target Support |
| 22 | Moveable Fulcrum Assembly |
| 23 | Planar Target |
| 24 | Laser |
| 26 | Crane Load Cell |
| 28 | Arm Load Cell |
| 30 | Lower Fulcrum Support Assembly |
| 32 | Fulcrum |
| 34 | Guide Pin |
| 36 | Lower Support Load Cell |
| 38 | Fulcrum Axle |
| 40 | Anti-Friction Bearing |
| 44 | Hoist Separator Plate |
| 46 | Fulcrum Wheel |
| 48 | Upper Fulcrum Support |
| 50 | Fulcrum Anti-Friction Bearing |
| 52 | Reversible Fulcrum Clamping Spacer |
| 54 | Outside Clamping Spacer |
| 56 | Upper Fulcrum Support Anti-Friction Bearing |
| 58 | Perpendicularly Bi-Axial Fulcrum |
| 60 | Hydraulic Cylinder |
| 64 | Hydraulic Ram |
| 62 | Axial Attachment Plate |
| 66 | Bi-Axial Anti-Friction Bearings |
| 68 | Pressure Transducer |

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and the equivalents thereof. The use of "consisting of" and variations thereof herein is meant to encompass only the items listed thereafter and equivalents thereof.

DETAILED DESCRIPTION OF THE PREFERRED EMBODIMENTS

Figure 1:
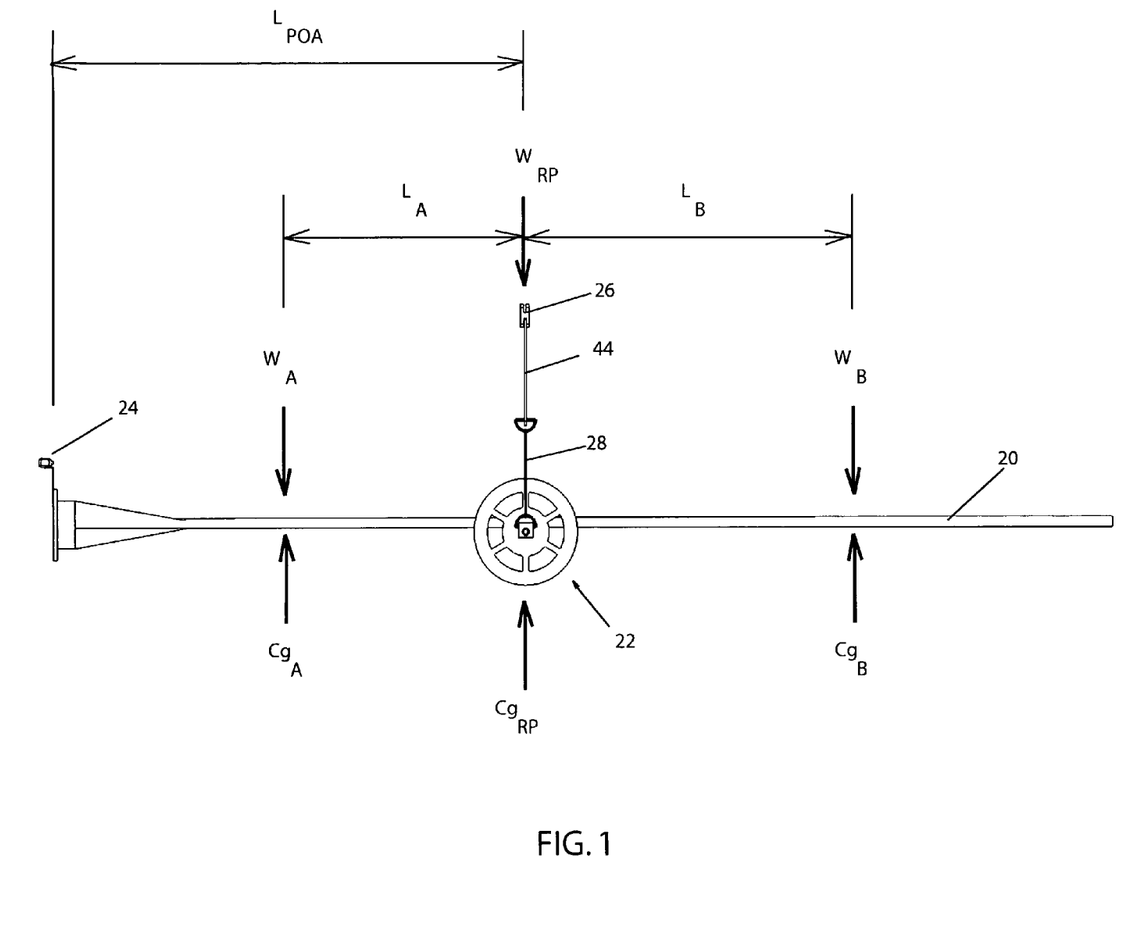
FIG. 1 illustrates the free body force diagram of a radial projection in horizontal equilibrium.

Description—FIG. 1

In order to appreciate the method and apparatus disclosed, one must first understand basis upon which the objects of the invention can be realized. FIG. 1 is a free body equilibrium force diagram which illustrates the forces due to the distributed weight of a radial projection 20, the centers of gravity at which these distributed weights can be said to act, and the reaction force due to a moveable fulcrum assembly 22. In equilibrium, the sum of the moments around any point must be necessarily zero. In this case, a moment is the force of weight due to gravity multiplied by the perpendicular distance to moveable fulcrum assembly 22. It is given that there will be a distributed weight $W_A$ located at a center of gravity $Cg_A$ of radial projection 20 to the left of moveable fulcrum assembly 22. It is also given that there will be a distributed weight $W_B$ located at a center of gravity $Cg_B$ to the right of moveable fulcrum assembly 22. Summing the moments around moveable fulcrum assembly 22, it follows that:

$$\Sigma M_{CgRP}=0$$

$$M_A=L_A \times W_A$$

$$M_B=L_B \times W_B$$

$$M_A-M_B=0$$

$$M_A=M_B$$

$$L_A \times W_A = L_B \times W_B$$

$$L_A/L_B = W_B/W_A$$

Since the center of gravity of radial projection 20 is unknown, one can find it by adjusting moveable fulcrum assembly 22 along radial projection 20. When radial projection 20 no longer has the tendency rotate from a substantially horizontal position; the state of equilibrium has been reached; the sum of the moments around moveable fulcrum assembly 22 are zero; and the center of gravity of radial projection 20 has thus been determined. Once the location of the center of gravity of radial projection 20 has been determined, the span wise moment of radial projection 20 can be calculated by applying the total weight of radial projection 20 at the location of its center of gravity and multiplying the distance from its center of gravity to the plane of attachment of radial projection 20 by the total weight.

$$\text{Span Moment} = W_{RP} \times L_{POA}$$

If all of the span wise moments of the radial projections associated with a rotating assembly are equal, it necessarily follows that center of rotating mass of the assembly will be concentric with its axis of rotation.

It can be appreciated through the same process there can be a moment around a longitudinal axis parallel to the span of radial projection 20 where centers of gravity would exist on an axis perpendicular the span called the chord wise axis. It is then given that a chord wise moment can exist around any arbitrary axis parallel to the span wise axis and contained within radial projection 20. This arbitrary axis could be equivalent to the axis around which radial projection 20 adjusts for pitch. For each radial projection to behave in a similar fashion during operation the chord wise moments of each radial projection should be equal or they will produce a dynamic imbalance of the rotating assembly. The following details of the preferred embodiments are explained with this above background information in mind.

Description—FIGS. 2, 2A, 2B, 2C Preferred Embodiment

Figure 2:
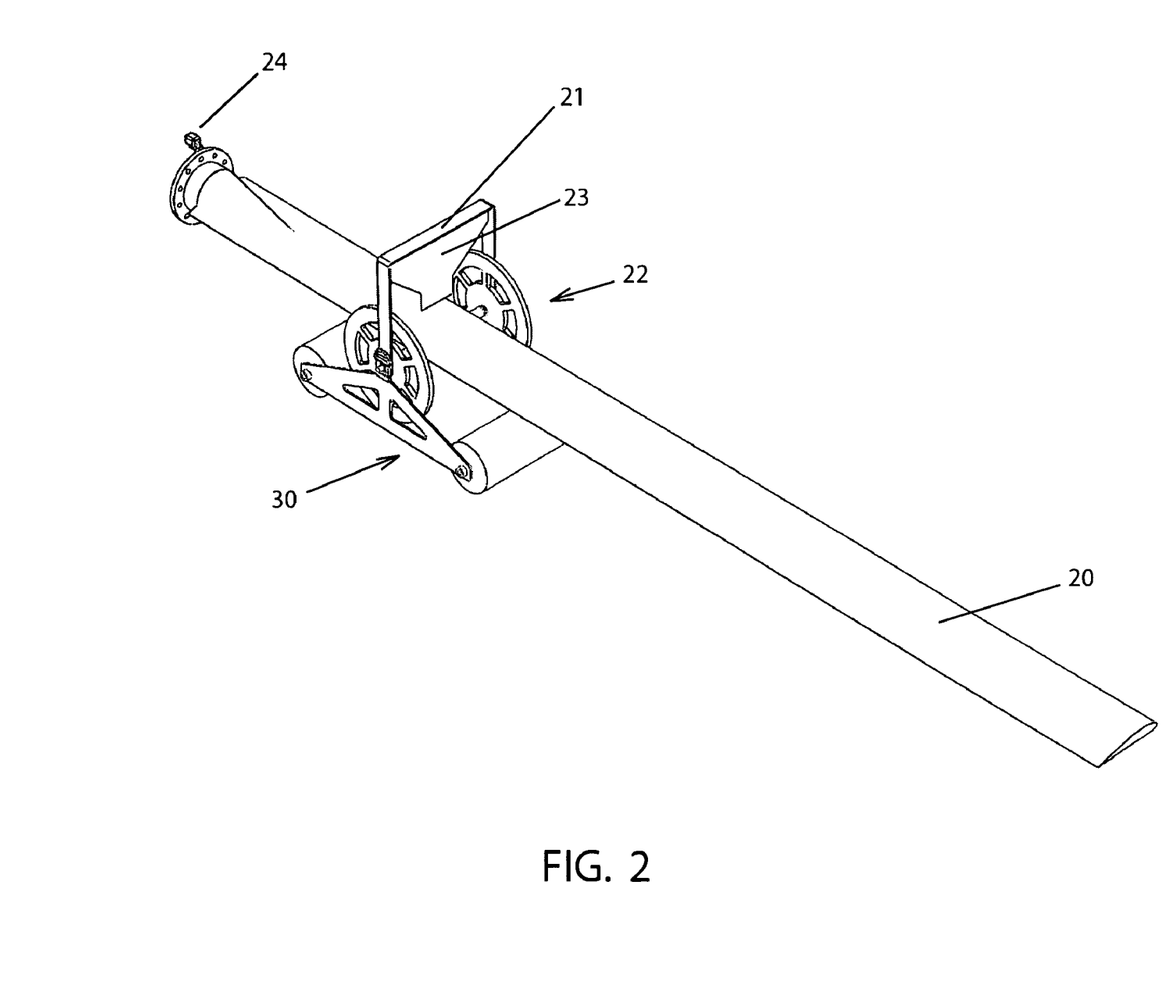
FIG. 2 illustrates an isometric view of a preferred embodiment having moveable fulcrum assembly supported from beneath the radial projection with planar target as the objective of the laser.
Figure 2A:
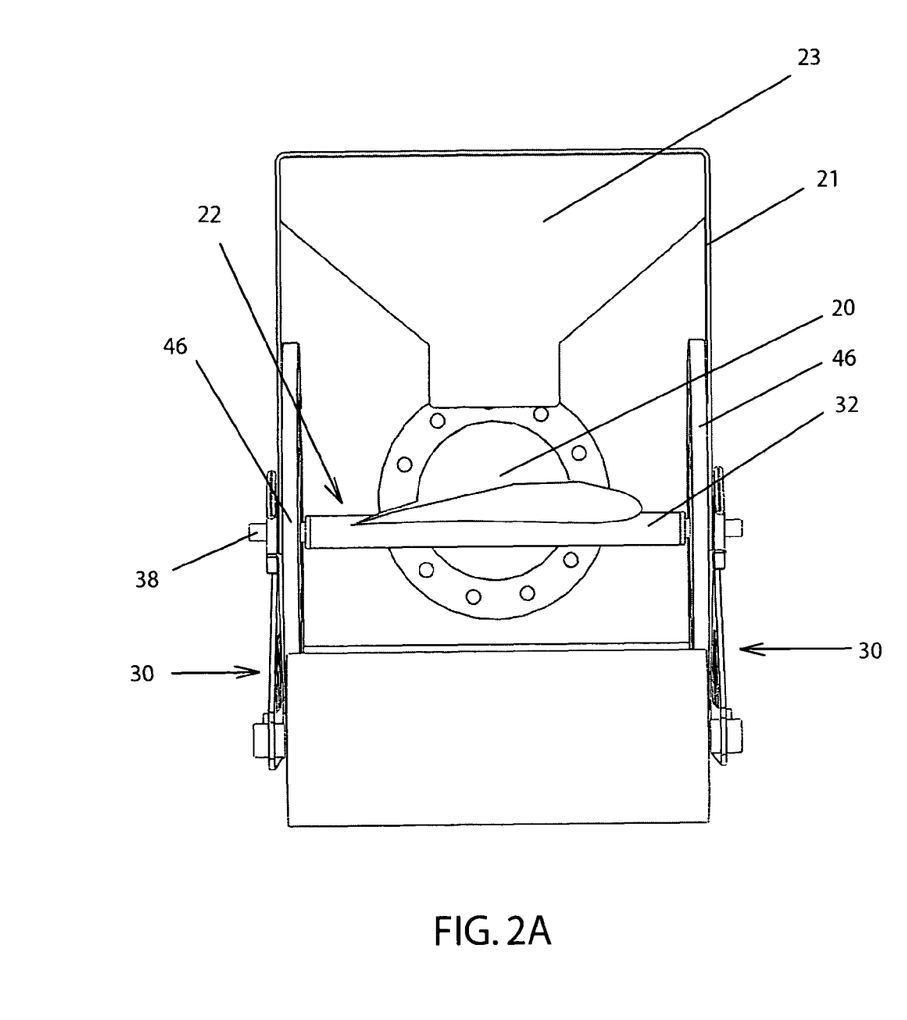
FIG. 2A illustrates a distal end view of FIG. 2.
Figure 2B:
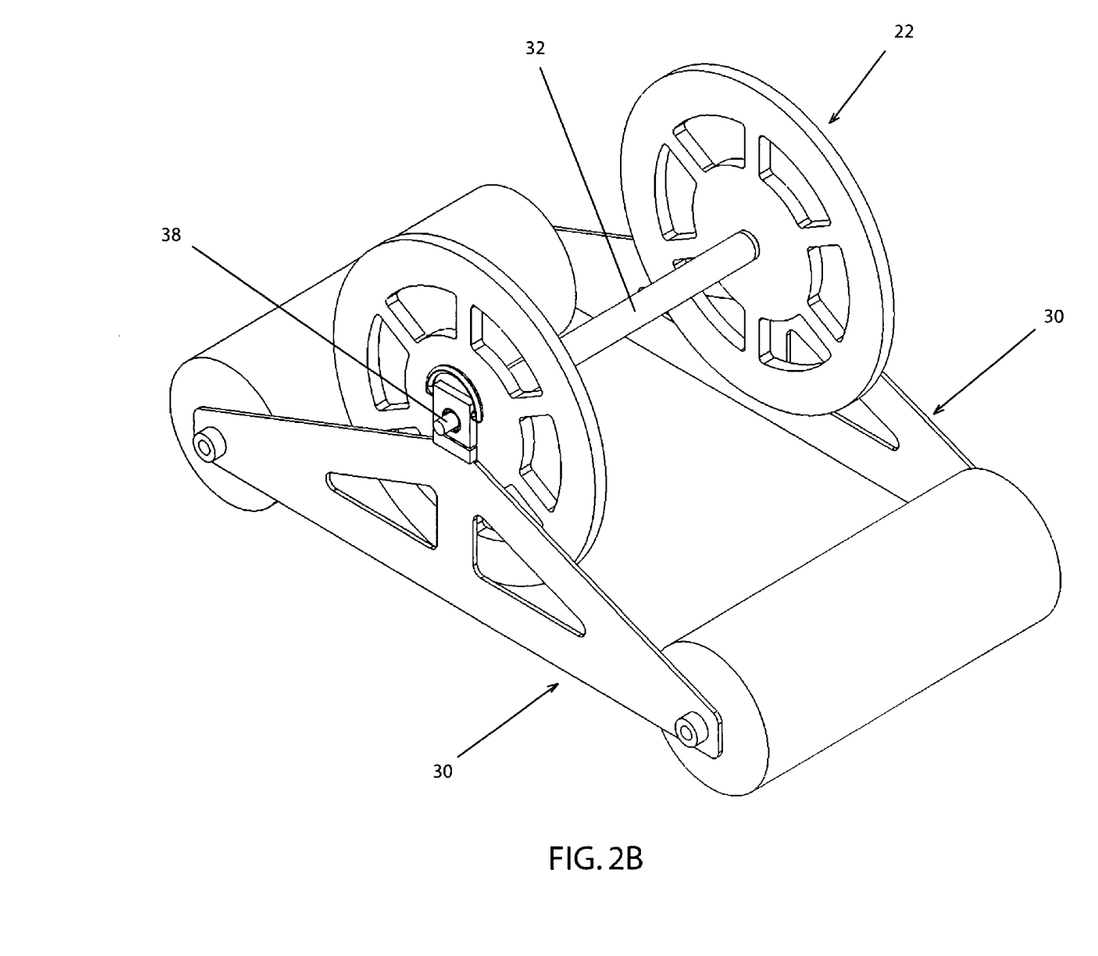
FIG. 2B illustrates an isometric view of the moveable fulcrum assembly.
Figure 2C:
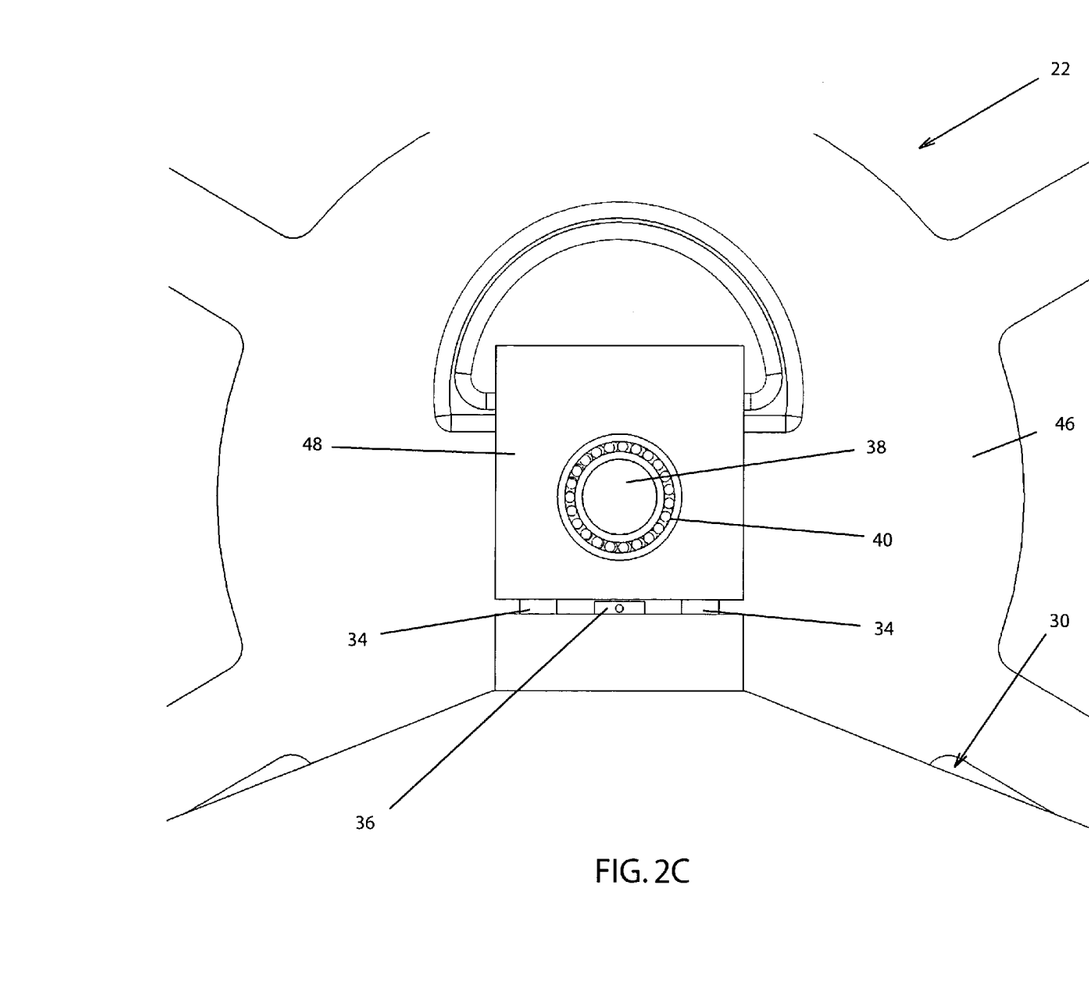
FIG. 2C illustrates a magnified view of one end of the moveable fulcrum assembly.

FIG. 2 illustrates an isometric view of moveable fulcrum assembly 22 supported by a lower fulcrum support assembly 30 from beneath radial projection 20. The proper relationship between moveable fulcrum assembly 22 and lower fulcrum support assembly 30 is established with a guide pin 34 shown in FIG. 2C. The guide pins 34 are fixed in fulcrum support assembly 30. Guide pins 34 are received by an upper fulcrum support 48.

The moveable fulcrum assembly 22 is adjusted along the span wise direction of radial projection 20 until a substantially horizontal equilibrium is established. It should be appreciated that the translation of moveable fulcrum assembly 22 can be accomplished in a variety of manners e.g. applying linear torque to lower fulcrum support assembly 30 with a winch or hoist or having lower fulcrum support assembly 30 powered by an electric or hydraulic motor. The lower fulcrum support assembly 30 could be modified such that it is necessarily guided by a track to assure its relational movement to radial projection 20.

Once this equilibrium state is realized, the distance is measured from a laser 24 mounted on the plane of attachment of radial projection 20 to a planar target 23, which is now coincident with its center of gravity and the rotational axis of a fulcrum 32. In this state of equilibrium, the total weight is also measured by summing the forces at a lower support load cell 36 located at opposite ends of moveable fulcrum assembly 22 between upper fulcrum support 48 and lower fulcrum support assembly 30. Furthermore, a predetermined distance has been established in the positioning of the chord wise direction of radial projection 20 along the rotational axis of fulcrum 32 from a preferred longitudinal axis on radial projection 20 to each of the load cell locations.

The measurements of force and distance are communicated to a conventional computer common in the art of process measurement where the span wise moment is calculated according to the sum of lower support load cell 36 measurements which are biased to a zero force when moveable fulcrum assembly 22 is empty of radial projection 20. With the predetermined distance of the preferred longitudinal axis to each of lower support load cell 36, respectively, the chord wise moment is calculated. The measurements and calculations are displayed on terminal and stored to storage media. Once the process has been completed for all radial projections of a rotating assembly, a preferred span moment is chosen by to which all of the other radial projections will be adjusted. Practically, the maximum span moment of the radial projections is chosen as the preferred span moment as it is easier to add weight to the other radial projections than it is to remove it. Additionally, a preferred chord wise moment is chosen as the maximum chord wise moment of the radial projections for the same reason.

It should be appreciated that the communication between laser 24 and lower support load cell 36 can be achieved by either a wired or wireless technology as are both common in the measurement and process control art. It should also be appreciated that all measurements can be displayed numerically, graphically, or both as is common in the measurement and process control arts. It should be further appreciated that any data obtained can be stored and retrieved by any means common in the art of data processing.

It is desirable to add a minimum amount of weight to correct both the span wise moment and cord wise moment to the preferred span wise and preferred chord wise moment. For each radial projection, the corrective weight necessary to obtain the preferred chord wise moment is subtracted from the corrective weight necessary to obtain the preferred span wise moment. The resulting corrective span wise weight is then placed at a distance off of the preferred longitudinal axis such that the product of the resulting corrective span weight and the chord wise off axis distance equals the preferred cord wise moment. Simultaneously, the longitudinal placement of the resulting corrective weight will result in the preferred span moment.

Description—FIGS. 3, 3A, 4, 4B Preferred Embodiment

Figure 3:
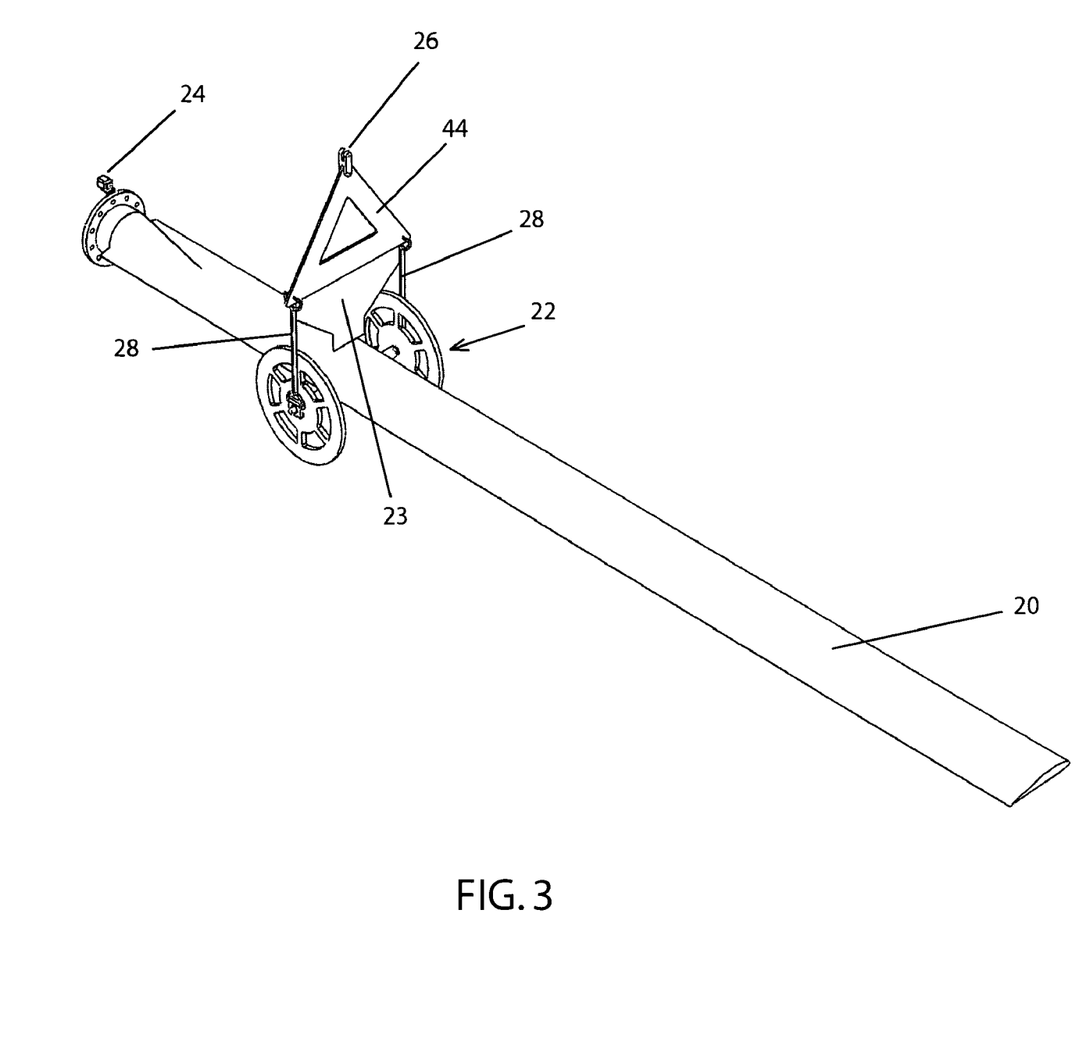
FIG. 3 illustrates an isometric view of another preferred embodiment having the moveable fulcrum assembly supported from above the radial projection with planar target as the objective of the laser.
Figure 3A:
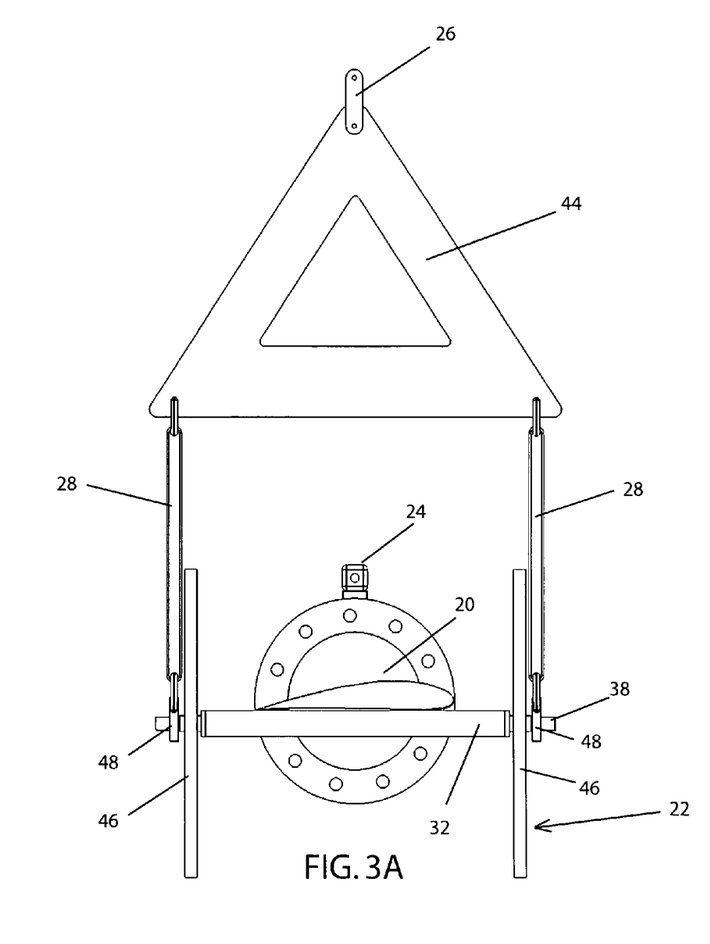
FIG. 3A illustrates a distal end view of FIG. 3 without planar target, for clarity.

FIG. 3 illustrates an isometric view of another preferred embodiment. FIG. 3A illustrates a distal end view where moveable fulcrum assembly 22 supported by upper fulcrum support 48 from above radial projection 20. The moveable fulcrum assembly 22 is adjusted along the span wise direction of radial projection 20 until a substantially horizontal equilibrium is established. In this configuration, the distal end of radial projection 20 can be placed on fulcrum 32, and translation of moveable fulcrum assembly 22 can be achieved by applying a hoist or crane to a crane load cell 26 and pulling it in the intended direction of travel by hoisting at an acute angle to radial projection 20 until a horizontal state of equilibrium is established.

Figure 4:
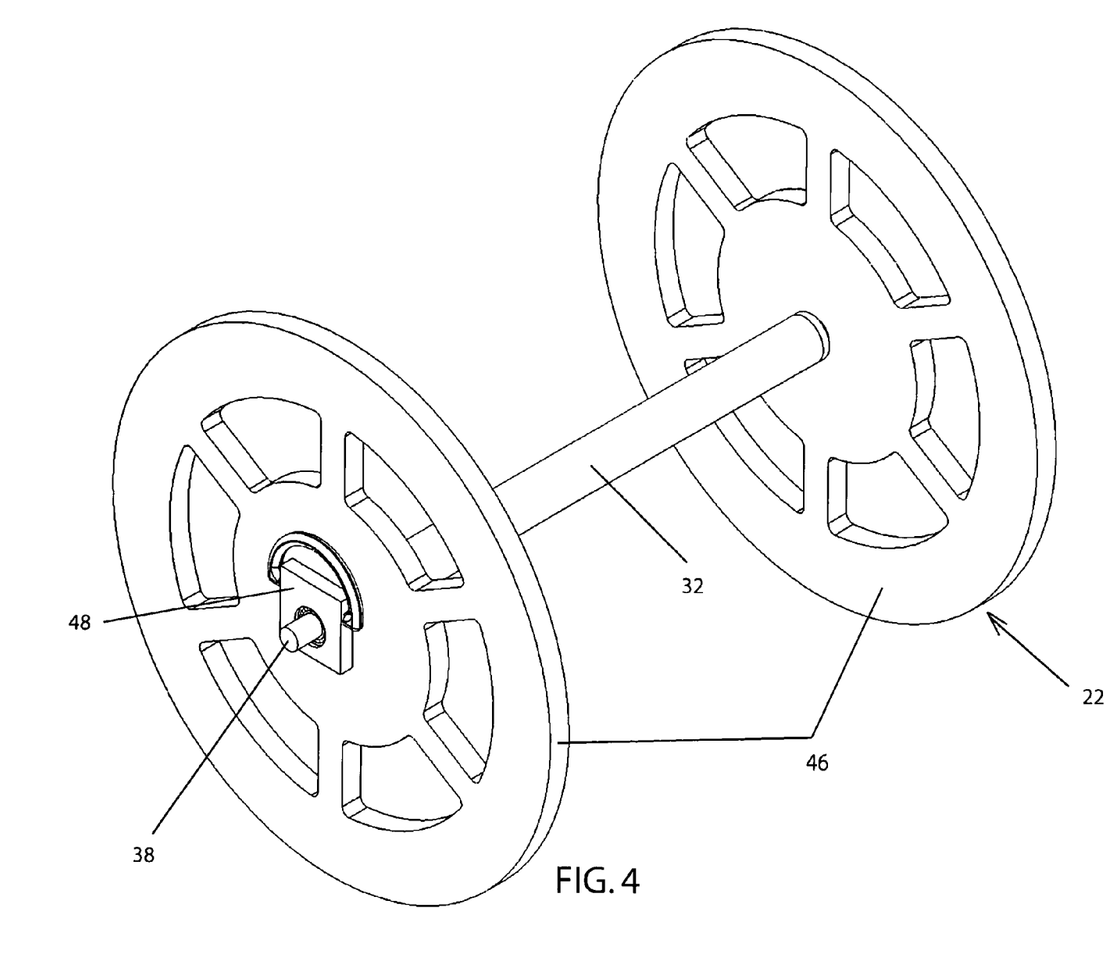
FIG. 4 illustrates an isometric view of the fulcrum assembly.
Figure 4A:
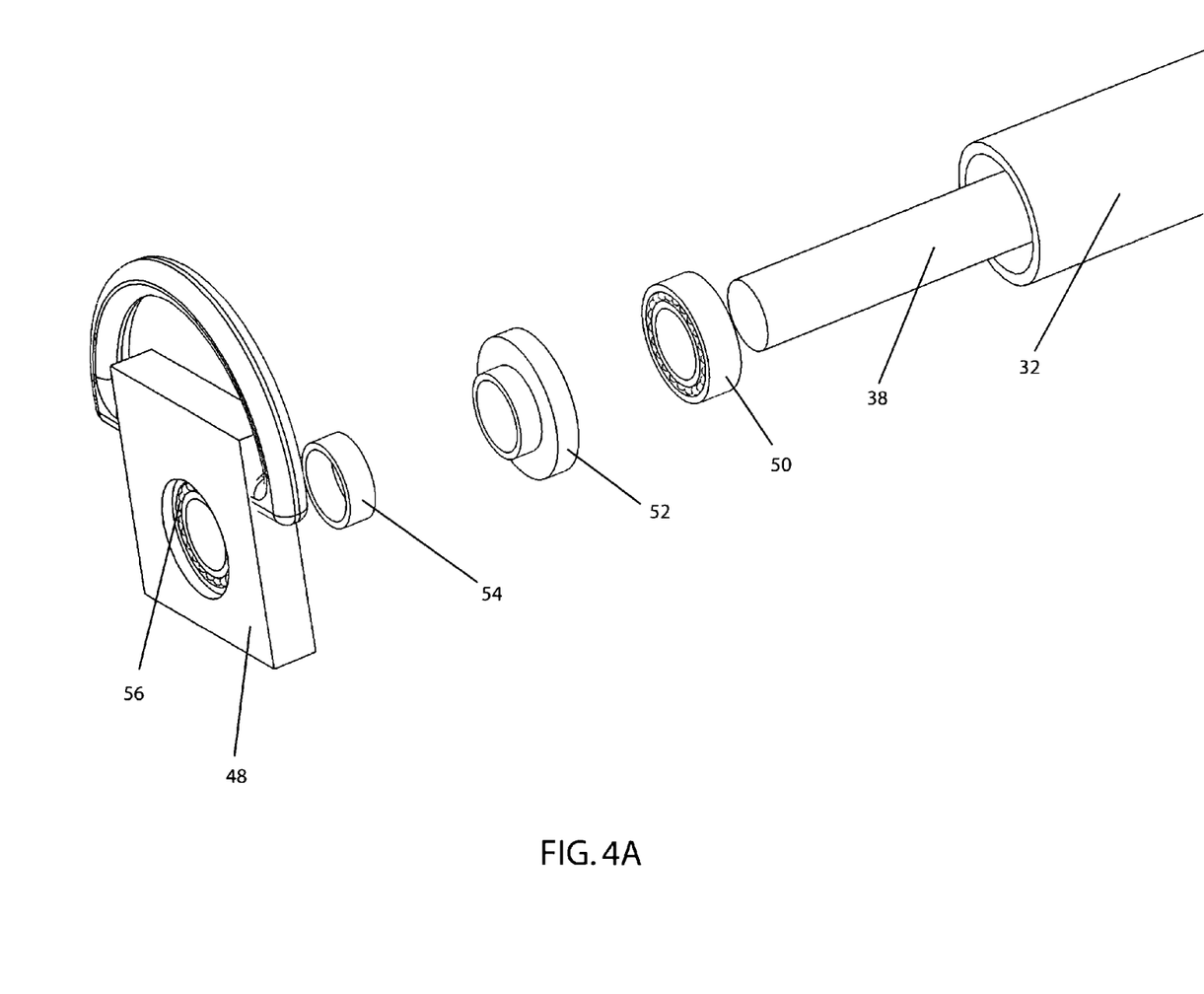
FIG. 4A illustrates an exploded part view of one end of fulcrum assembly with fulcrum wheel omitted from illustration.
Figure 4B:
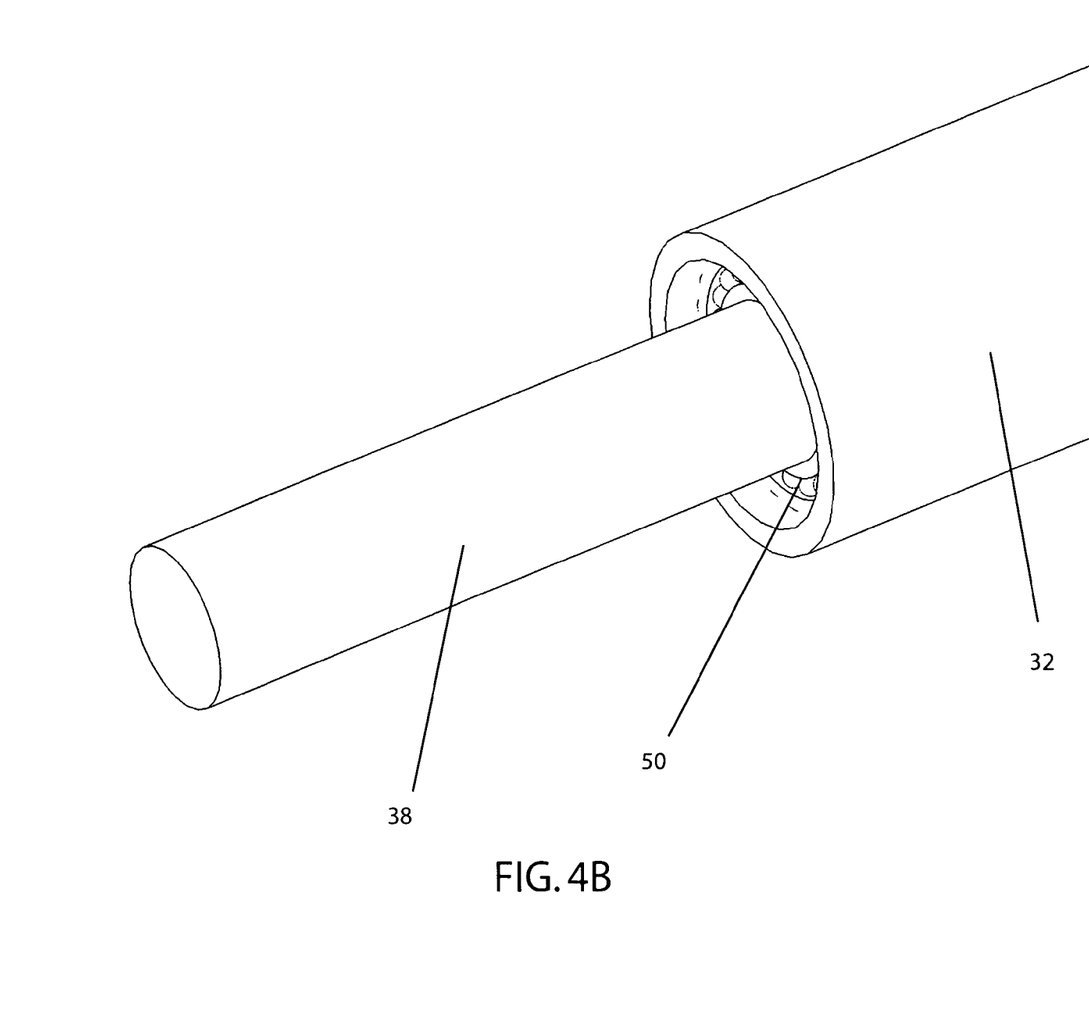
FIG. 4B illustrates the fulcrum and fulcrum axle with anti-friction bearing.

FIG. 4 illustrates moveable fulcrum assembly 22. It illustrates fulcrum 32, a fulcrum axle 38, a fulcrum wheel 46, and upper fulcrum support 48. FIG. 4A illustrates an exploded view of one end of moveable fulcrum assembly 22 with the fulcrum wheel 46 removed for clarity. In this arrangement, fulcrum 32 is supported by the fulcrum axle 38 with a fulcrum anti-friction bearing 50 which allows the rotation of fulcrum 32 relative to the fulcrum axle 38. If a mode of operation is to have fulcrum 32 rotate in synchronicity with the fulcrum wheel 46, the arrangement as illustrated achieves the mode by clamping the inner race of a upper fulcrum support anti-friction bearing 56 to an outside clamping spacer 54, to the fulcrum wheel 46, not shown, to a reversible fulcrum clamping spacer 52, and to fulcrum 32. This mode of operation is desirable if moveable fulcrum assembly 22 is support by lower support assembly 30 and small adjustments to the longitudinal position of radial projection 20 are necessary to obtain a precise equilibrium without having to move lower support assembly 30. If a mode of operation is to have fulcrum 32 move independently of the fulcrum wheel 46, the arrangement is the same with the exception that reversible clamping spacer 52 has an orientation 180 degrees from the FIG. 4 illustration and clamps the inner race of the fulcrum anti-friction bearing 50 to a shoulder (not shown) on the fulcrum axle 38, thereby allowing fulcrum 32 to rotate independently of the fulcrum wheel 46. This mode of operation is desirable when the moveable fulcrum assembly 22 in being translated longitudinally with a hoist or crane.

Once this equilibrium state is realized, the hoist or crane is returned to a perpendicular position relative to radial projection 20, the distance is measured from a laser 24 mounted on the plane of attachment of radial projection 20 to planar target 23, which is now coincident with its center of gravity and the rotational axis of fulcrum 32. In this state of equilibrium, the total weight is also measured by hoisting moveable fulcrum assembly 22 such that weight of radial projection 20 is no longer supported by fulcrum wheels 46 and summing the forces a arm load cell 28 located at opposite ends of moveable fulcrum assembly 22 between hoist separator plate 44 and upper fulcrum support 48. Furthermore, a predetermined distance has been established in the positioning of the chord wise direction of radial projection 20 along the rotational axis of fulcrum 32 from a preferred longitudinal axis on radial projection 20 to each of arm load cell 28 locations.

The measurements of force and distance are communicated to a computer where the span wise moment is calculated according to the sum of arm load cell 28 measurements which are biased to a zero force when moveable fulcrum assembly 22 is empty of radial projection 20 and not supported by fulcrum wheels 46. With the predetermined distance of the preferred longitudinal axis to each of the respective lower support load cells 36, the chord wise moment is calculated. The measurements and calculations are displayed on a terminal and stored to storage media. Once the process has been completed for all radial projections of a rotating assembly, a preferred span moment is chosen by to which all of the other radial projections will be adjusted. Practically, the maximum span moment of the radial projections is chosen as it is easier to add weight to the other radial projections than it is to remove it. Additionally, a preferred chord wise moment is chosen as the maximum chord wise moment of the radial projections for the same reason.

It should be appreciated that the communication between laser 24 and arm load cells 28 can be achieved by either a wired or wireless means as are both common in the measurement and process control art. It should also be appreciated that all measurements can be displayed numerically, graphically, or both as is common in the measurement and process control arts. It should be further appreciated that any data obtained can be stored and retrieved by any means common in the art of data processing.

It is desirable to add a minimum amount of weight to correct both the span wise moment and cord wise moment to the preferred span wise and preferred chord wise moment. For each radial projection 20, the corrective weight necessary to obtain the preferred chord wise moment is subtracted from the corrective weight necessary to obtain the preferred span wise moment. The resulting corrective span wise weight is then placed at a distance off of the preferred longitudinal axis such that the product of the resulting corrective span weight and the chord wise off axis distance equals the preferred cord wise moment. Simultaneously, the longitudinal placement of the resulting corrective weight will result in the preferred span moment.

Figure 5:
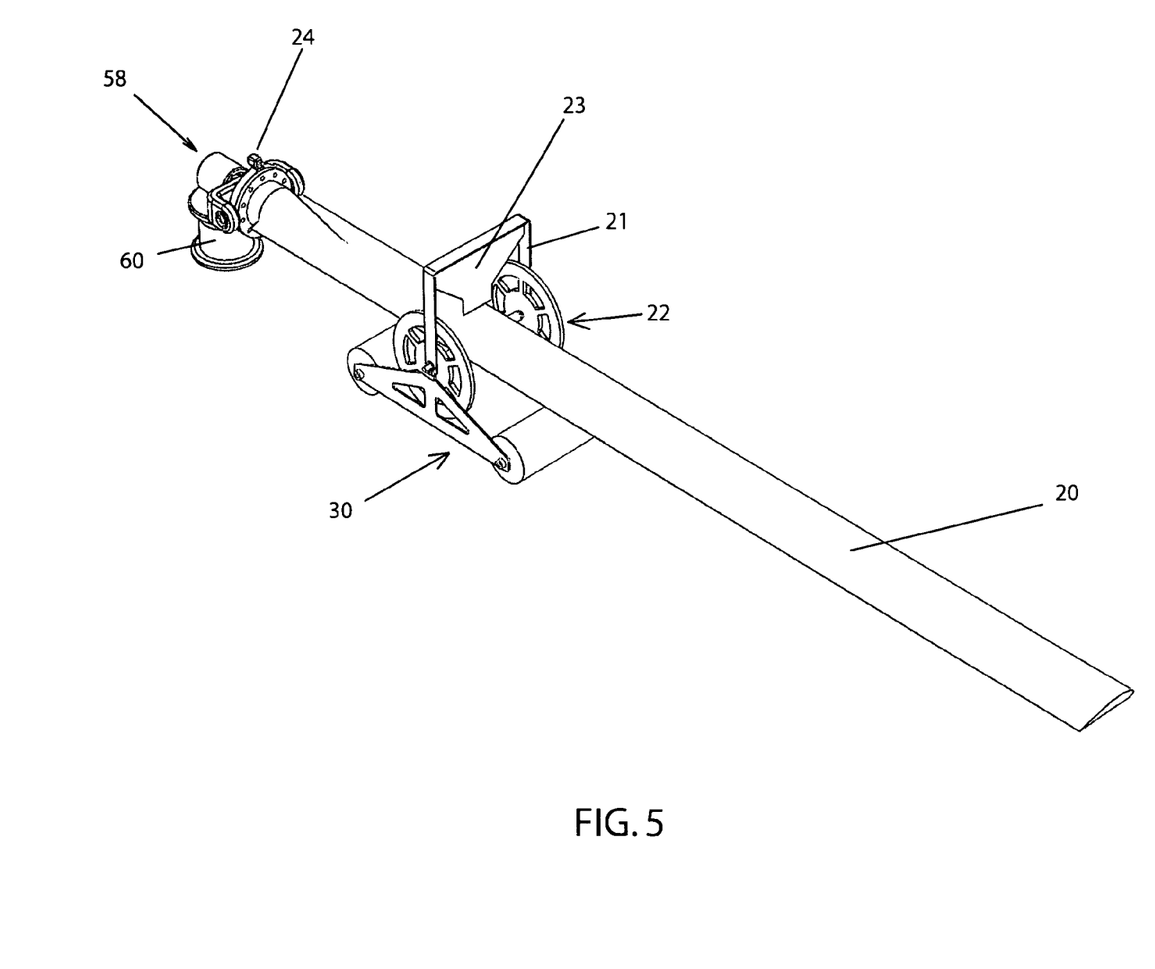
FIG. 5 illustrates an isometric view of another preferred embodiment where a lower supported, moveable fulcrum assembly is used with a perpendicularly bi-axial fulcrum and the planar target as the objective of the laser.
Figure 6:
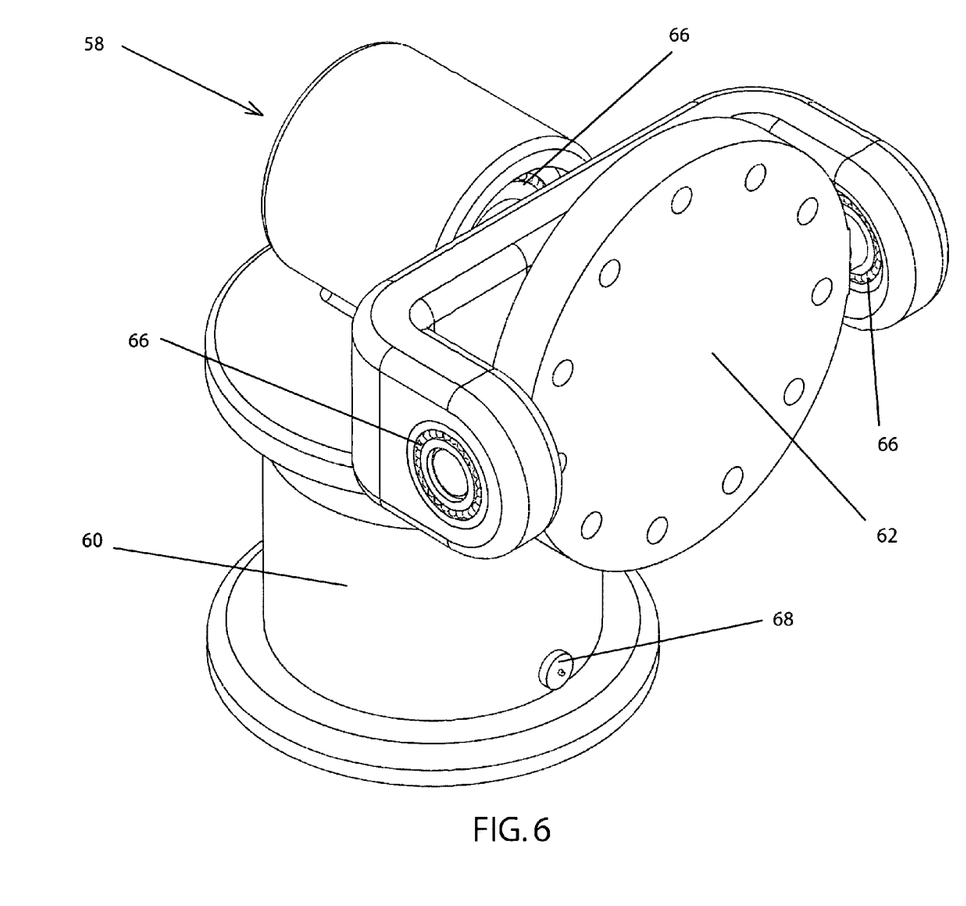
FIG. 6 illustrates an isometric view of the perpendicularly bi-axial fulcrum with adjustable height.
Figure 6A:
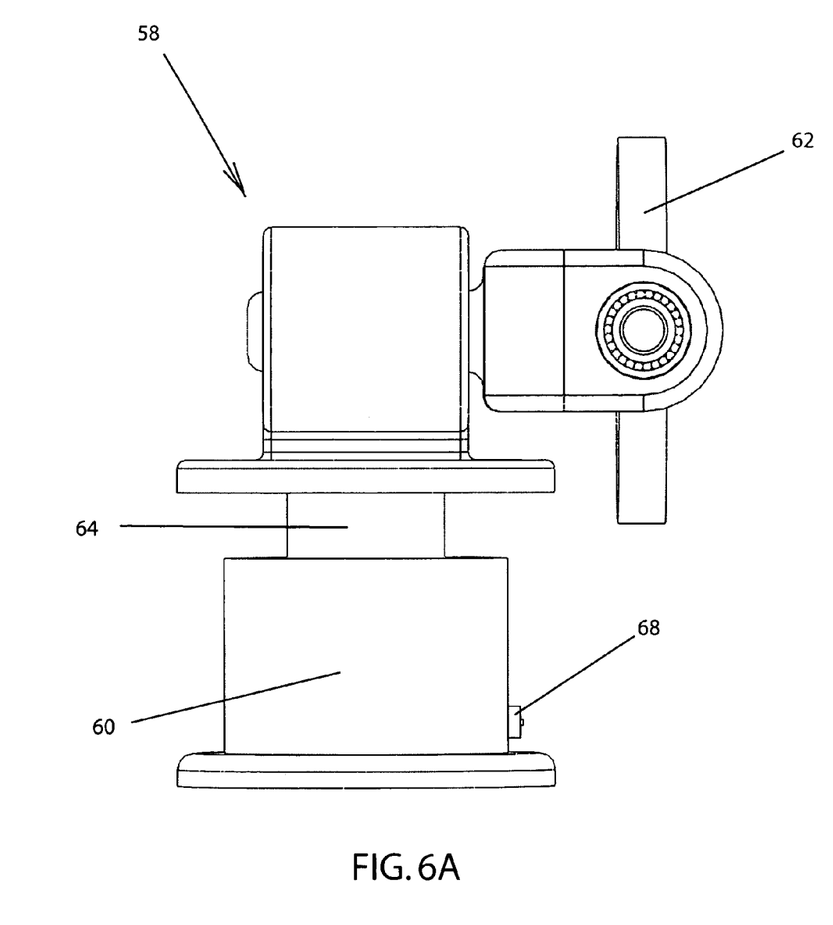
FIG. 6A illustrates a side view of perpendicularly bi-axial fulcrum with adjustable height.

Description—FIGS. 5, 6, 6A Preferred Embodiment

Another embodiment of the invention is used to find a series of span wise and chord wise moments along the entire length of radial projection 20 to establish a profile of span wise and chord wise moments verses distance. By dividing each span wise moment by its respective distance and each chord wise moment by its chord wise distance, a profile of weight distribution can be plotted for the entire length of radial projection 20. This profile can be compared to profiles of other radial projections.

FIG. 5 illustrates an isometric view of another embodiment. In this embodiment, the illustration shows moveable fulcrum assembly 22 supported by lower fulcrum support assembly 30 and a perpendicularly bi-axial fulcrum assembly 58 connected to the plane of attachment of radial projection 20 with an axial attachment plate 62. The height of perpendicularly bi-axial fulcrum assembly 58 can be adjusted with a hydraulic cylinder 60 and a hydraulic ram 64 connected to perpendicularly bi-axial fulcrum assembly 58 such that there is no attitude change in radial projection 20 as moveable fulcrum assembly 22 translates the span of radial projection 20. Due to its bi-axial nature, the only span wise and chord wise moment reactions around the plane of attachment of radial projection 20 will be at moveable fulcrum assembly 22. The pressure of the hydraulic cylinder is measured by a pressure transducer 68. The force that is produced by hydraulic ram 64 can be calculated by dividing the measured pressure by the cross sectional surface area of hydraulic ram 64. This force is necessarily the force acting through the perpendicularly bi-axial fulcrum assembly 58. Since this force is the moment around moveable fulcrum assembly 22, the location of moveable fulcrum assembly 22 is at the center of gravity when this force is zero.

It should be appreciated that axial attachment plate 62 can be fashioned to match any configuration required to properly mount radial projection 20 in a manner consistent with its mounting to a rotating assembly. It should also be appreciated that a plurality of moveable fulcrum assemblies could be used in the event that the structure of radial projection 20 will not support its own weight at any point along its span and not depart either from the principle of operation or the scope of the invention.

In operation of the invention in this embodiment moveable fulcrum assembly 22 is translated along the span wise direction of radial projection 20. It should be appreciated that the translation of moveable fulcrum assembly 22 can be accomplished in a variety of manners e.g. applying linear torque to lower fulcrum support assembly 30 with a winch or hoist or having lower fulcrum support assembly 30 powered by an electric or hydraulic motor. The lower fulcrum support assembly 30 could be modified such that it is necessarily guided by a track to assure its relational movement to radial projection 20 and the perpendicularly bi-axial fulcrum assembly 58.

The distance is measured from laser 24 mounted on the plane of attachment of radial projection 20 to planar target 23 is continuously communicated to a computer as are the forces at lower support load cell 36 located at opposite ends of moveable fulcrum assembly 22 between upper fulcrum support 48 and lower fulcrum support assembly 30. Additionally, the pressure from pressure transducer 68 connected to hydraulic cylinder 60 is continuously communicated to the computer to use this embodiment as a method to balance radial projection 20 as will be described later. A predetermined distance has been established in the positioning of the chord wise direction of radial projection 20 along the rotational axis of fulcrum 32 from a preferred longitudinal axis on radial projection 20 to each of the load cell locations. When the computer registers a change in distance as communicated by the laser and the change exceeds a predefined threshold established by the user, the computer displays and stores the measurement of the longitudinal distance and the measurement of forces at lower support load cells 36, and the pressure at pressure transducer 68 of hydraulic cylinder 60 and calculates, stores, and displays the span wise and chord wise moments about the perpendicularly bi-axial fulcrum assembly 58. This process continues until moveable fulcrum assembly 22 translates the entire span of radial projection 20.

As moveable fulcrum assembly 22 translates the span of radial projection 20, the pressure in hydraulic cylinder 60 will change as it is the reaction moment force of the radial projection 20 around the moveable fulcrum assembly 22. At some point in the translation, the pressure will be zero. At this point, moveable fulcrum assembly 22 will be at the center of gravity of radial projection 20. Since all of the data necessary to balance radial projection 20, as described previously in the other embodiments, is acquired throughout the translation of moveable fulcrum assembly 22, the data can be either retrieved at this exact point or interpolated from the data series. Thus, this embodiment can provide not only a profile of span wise moments and chord wise moments for the entire span of radial projection 20 as well as the derived weight distribution but will necessarily include the data to balance radial projection 20 at its center of gravity. Furthermore, this embodiment can be automated as is common in the art of process control such that all of the operation described can be achieved without human intervention and without departing from the scope of the invention.

It should be appreciated that the communication between laser 24 and lower support load cell 36 can be achieved by either a wired or wireless technology as are both common in the measurement and process control art. It should also be appreciated that all measurements can be displayed numerically, graphically, or both as is common in the measurement and process control arts. It should be further appreciated that any data obtained can be stored and retrieved by any means common in the art of data processing. Furthermore, the data obtained can be assigned to a mathematical model of the mechanical structure of radial projection 20 for evaluation. Additionally, any profile can be retrieved and compared to a newly acquired profile.

What is claimed is:

1. A method of statically equalizing a span wise and a chord wise moment of a radial projection of a plurality of radial projections which have been detached from a rotating assembly, the method for equalizing a span wise moment comprising the steps of:
    (a) determining the location of the center of gravity of said radial projection by adjusting a moveable fulcrum, approximately perpendicular to and along the span wise axis of said radial projection, until an equilibrium has been established in a substantially horizontal position,
    (b) measuring the distance from said location to a plane perpendicular to the span wise axis of said radial projection and which contains the plane of attachment of said radial projection to said rotating assembly,
    (c) measuring the total weight of said radial projection,
    (d) multiplying the said total weight by the said distance to yield a span wise moment,
    (e) determining a preferred span wise moment, and then
    (f) adding or subtracting weight to or from said radial projection to create a modified span wise moment of each of the said plurality of radial projections approximately equal to said preferred span wise moment;
the method for equalizing chord wise moments comprising the steps of:
    (g) establishing a preferred longitudinal axis, substantially parallel to the span wise axis of said radial projection,
    (h) measuring the weights of the said radial projection in the state of horizontal equilibrium at opposite ends of said moveable fulcrum assembly,
    (i) measuring the chord wise distances of said opposite ends of said moveable fulcrum to said preferred longitudinal axis,
    (j) multiplying said chord wise distances by said weights to determine respective clockwise and counterclockwise momentums about said preferred longitudinal axis to establish chord wise momentum of said radial projection by summing said counterclockwise and clockwise momentums whereby a consistent sign convention for direction of rotation in maintained,
    (k) determining a preferred chord wise moment, and then
    (l) adding or subtracting weight to or from said radial projection away from said preferred longitudinal axis to create a modified chord wise moment of said radial projection approximately equal to said preferred chord wise moment.

2. The method of claim 1 wherein said moveable fulcrum comprises a supported cylinder, substantially free to rotate about its axis, and wherein the means of support is above or below said radial projection.

3. The method of claim 1 wherein said total weight is measured by at least one load cell in communication with said moveable fulcrum and is substantially parallel to the force of gravity.

4. The method of claim 1 wherein said total weight is measured by a plurality of loads cells in communication with said moveable fulcrum and substantially parallel to the force of gravity whereby the sum of the weight indications from said plurality of load cells is substantially equal to the total weight of the radial projection.

5. The method of claim 1 wherein the measurement of said distance is achieved by means of a linear transducer whose objective measurement end is a plane containing the rotational axis of said moveable fulcrum and substantially perpendicular to the longitudinal axis of said radial projection.

6. The method of claim 5 wherein the said linear transducer is an optical measurement device and wherein the objective measurement end is a planar target.

7. The method of claim 6 wherein said optical measurement device is a laser.

8. Method of claim 1 further includes a communication means to transfer said weight and said distance measurements to a processing means for calculations of said span wise moment and said chord wise moment of said radial projection, to a storage means for measurements and calculations, and to a display means for indication of measurements and calculations.

9. Method of claim 8 further includes a recall means from said storage means to transfer said calculations of said span wise moment and said chord wise moment to a processing means to calculate corrective weight and corrective distance for each of said radial projections such that the said modified span wise moment and said modified chord wise moment of each of said radial projection is substantially equal to said preferred span wise moment and substantially equal to preferred chord wise moment.

10. Method of claim 1 wherein the addition or subtraction of weight to establish said preferred span wise moment occurs substantially on a neutral span wise axis of said radial projection whereby there is no change in chord wise moment about said neutral longitudinal axis with application of said corrective weight.

11. Method of claim 1 wherein, to minimize the total weight applied to said radial projection, the preferred steps to apply the corrective weight to said radial projection, from which said preferred chord wise momentum and said preferred span wise momentum are established, comprise:
    (a) determining the chord wise corrective weight and chord wise corrective distance to establish preferred chord wise moment,
    (b) determining the span wise corrective weight and span wise corrective distance to establish said preferred span wise moment,
    (c) subtracting the said chord wise corrective weight from said span wise corrective weight to establish a modified span wise corrective weight,
    (d) applying said modified span wise corrective weight at a location whereby the said preferred span wise moment and said preferred chord wise moment are simultaneously realized.

12. A method of determining a plurality of span wise moments and chord wise moments along the longitudinal axis of a radial projection to establish a profile of said span wise moments and said chord wise moments, the method comprising the steps of:

(a) attaching a perpendicularly bi-axial fulcrum, supported by a fixed base, at the plane of attachment of said radial projection, substantially free to allow the rotation of the span wise direction of said radial projection to rotate about a first axis while simultaneously allowing the chord wise rotation of said radial projection to rotate about a second axis, (b) establishing a preferred longitudinal axis substantially parallel with the span wise direction of said radial projection, (c) measuring the distances from each opposite end of said a moveable fulcrum, (d) moving a second moveable fulcrum perpendicular to and along the span wise axis of said radial projection, (e) measuring the force reactions at said opposite ends of said second moveable fulcrum and at said perpendicularly bi-axial fulcrum, substantially parallel to the force of gravity, and the distance of said second moveable fulcrum to said first axis of rotation of said perpendicularly bi-axial fulcrum for each change in the span wise movement of said second moveable fulcrum, (f) communicating measurements of said force reactions and said distances to a storage means, to a processing means, and to an indicating means whereby the aggregate of measurements become said profile of said radial projection, (g) recalling from said storage means and transferring to a processing means to calculate a plurality of parameters associated with weight distribution of said radial projection, (h) recalling from said storage means said profile of parameters associated with said radial projection for comparison against a reference profile of parameters.

13. The method of claim 12 wherein said second moveable fulcrum is a supported cylinder, substantially free to rotate about its axis, and wherein the support means is above or below said radial projection.

14. The method of claim 12 wherein said force reactions are measured by at least one load cell in communication with said second moveable fulcrum.

15. The method of claim 12 wherein said force reactions are measured by a plurality of loads cells in communication with said second moveable fulcrum whereby the sum of the force reactions from said plurality of load cells is substantially equal to total force reaction of said radial projection.

16. The method of claim 12 wherein the measurement of said distance is by means of a linear transducer attached to plane of attachment whose objective measurement end is the plane containing said rotational axis of the said moveable fulcrum and substantially perpendicular to longitudinal axis of said radial projection.

17. The method of claim 16 wherein the said linear transducer is an optical measurement device and wherein the objective measurement end is a planar target.

18. The method of claim 17 wherein said optical measurement device is a laser.

19. The method of claim 12 further includes a means for adjusting the distance between the plane containing the axes of said perpendicularly bi-axial fulcrum and the supporting base of said perpendicularly bi-axial fulcrum.

20. The method of claim 19 wherein said means for adjusting said distance is the hydraulic pressure within a hydraulic cylinder acting against a hydraulic ram in communication with said perpendicularly bi-axial fulcrum whereby the hydraulic pressure can be used to indicate the reaction force at said perpendicularly bi-axial fulcrum.

* * * * *